W. C. FARNUM.
Weighing-Scales.
No. 216,514.  Patented June 17, 1879.
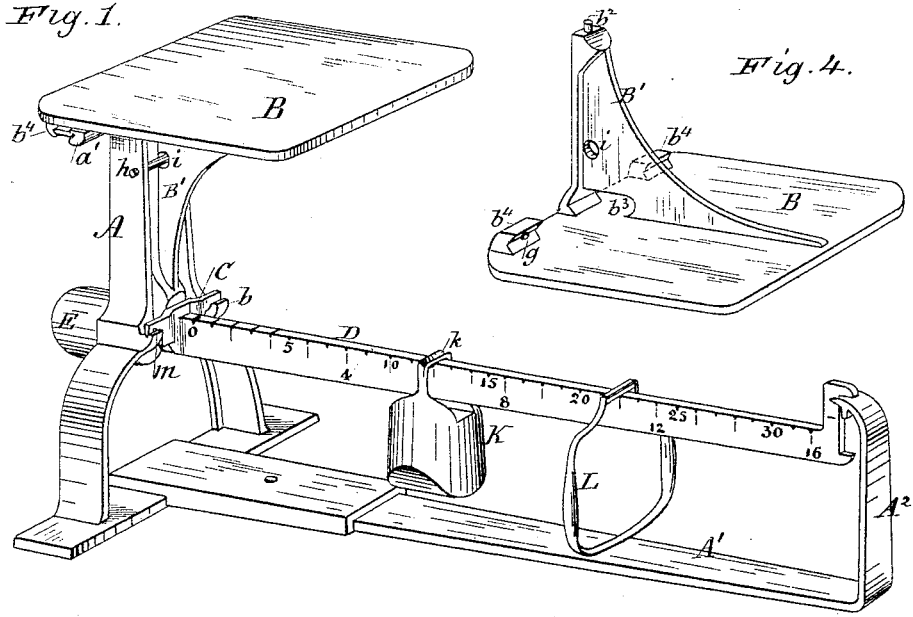
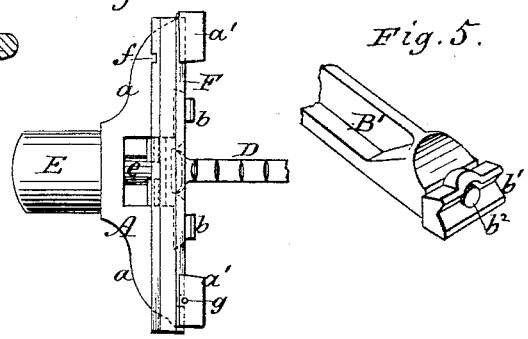
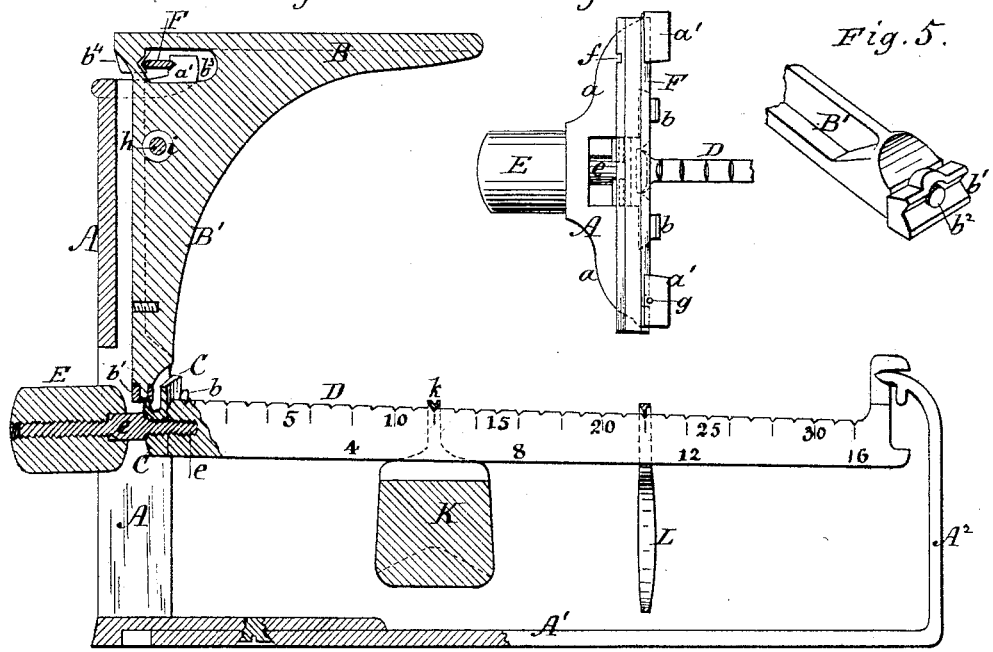
Witnesses:
W. B. Masson
W. E. Bowen
Inventor:
William C. Farnum
by E. E. Masson
atty.

UNITED STATES PATENT OFFICE.

WILLIAM C. FARNUM, OF HOOSICK FALLS, NEW YORK.

IMPROVEMENT IN WEIGHING-SCALES.

Specification forming part of Letters Patent No. 216,514, dated June 17, 1879; application filed April 11, 1879.

*To all whom it may concern:*

Be it known that I, WILLIAM C. FARNUM, of Hoosick Falls, in the county of Rensselaer and State of New York, have invented certain new and useful Improvements in Scales; and I do hereby declare that the following is a full, clear, and exact description of the same, reference being had to the accompanying drawings, making a part of this specification, in which—

Figure 1 represents a perspective view of the scale. Fig. 2 represents a vertical section of the same. Fig. 3 represents a top view of the standard with the platform removed. Fig. 4 represents, in perspective, the under side of the platform. Fig. 5 represents, in perspective, the lower end of said platform with a grooved steel bearing.

This invention relates to scales provided with a graduated beam, on one end of which a platform rests, and on the other weights are adapted to slide thereon to indicate pounds and parts thereof. Heretofore scales of this class have been constructed with two or more beams, each beam being provided with a poise or weight requiring double sets of knives and parts that increase their cost and liability to get out of order.

The object of my invention is to furnish a scale having a single platform and beam, and provided with two or more poises, said poises being so constructed as to be capable of passing one through the other, and be used jointly or separately, one of said poises being intended to indicate the number of pounds placed on the platform, and the other poise to indicate in addition the number of ounces or fractions of pounds placed on said platform. For this purpose the single beam has two sets of graduations, one of which is intended for the "pound-poise," and the other for the "ounce-poise."

My invention consists in the combination of a vertical frame having notches to receive knife-edge journals with a beam provided with a double set of knife-edges and a platform having a downward-extending arm formed with recesses to receive knife-edges at the top and bottom, through which means it is permitted to rise and fall with a minimum amount of friction.

It consists also in providing the knife-edges of a scale so constructed with notches to receive pins entering the frame or platform to retain the movable parts in a constant relative position.

It consists also in providing the beam of a scale with weights or poises capable of passing readily one through the other, or to encircle one the other, and rest in a notch on the bail of the other.

It also consists in combining, with poises of ring form or capable of passing one through the other, a beam provided with two or more graduated scales, each scale being adapted to indicate the weight balanced by one of the poises, as will be described hereinafter.

In the drawings, A represents the frame. It is made somewhat in the form of an X, with its upper branches, $a$, nearly horizontal. About half-way of its height there are formed on the frame brackets $b$, that are grooved horizontally to receive the knife-edges $c$ of the knife C. This knife is secured to the inner end of the beam D by a screw, $e$, extending rearward to move over and support the equipoise E of the beam. The platform B of the scale has on one side a downward-projecting arm, B', supported at its lower end on a knife-edge, $c^1$, of the knife C attached to the beam. For this purpose this lower end is protected by a recessed or grooved steel bearing, $b^1$, retained thereon by a projection or pin, $b^2$, on said lower end of the platform-arm. This pin $b^2$ projects beyond the recess in the bearing $b^1$ and enters a notch, $c^2$, in the edge of the knife $c^1$ to keep the lower end of the platform-arm in place upon said knife-edge.

The upper part of the platform is kept from tipping forward by the double-edge knife-plate F passing horizontally through an opening, $b^3$, on the under side of the platform and resting on one of its edges in grooves cut into lugs $b^4$ formed on the under side of the platform, and on the other edge in grooves cut in the ears $a'$, located on the frame adjacent to the end of each branch $a$. The edges of the knife-plate F being parallel with the edges of the double knife C, the platform can rock up and down with scarcely any friction. The knife-plate F and the upper portion of the platform B are kept from side movement and retained connected to the frame by pins $g$ in the lugs $b^4$ of the platform and in the ears $a'$ of the frame entering notches $f$ in the knife-plate F. To retain the platform permanently connected to the frame, a pin, $h$, is driven horizontally through said frame, and passes loosely through a hole, $i$, in the arm B', the hole being large enough to allow the platform to move up and down under the action of the beam. To give stability to the frame, it is extended horizontally by means of a flat bar, $A^1$, which is bent vertically at $A^2$ and curved at the top to arrest the motion of the beam within certain limits and form a guide in balancing a weight placed on the platform.

Upon the beam D two weights or poises are placed, the poise K being intended to balance pound-weights placed on the platform, and the poise L to balance ounces placed upon the same platform. One of these poises is made in the form of a ring of such size and proportions that the other can be passed through it. In the present instance this ring form is given to the ounce-poise as being preferable; but the reverse could also be done, and that form given to the pound-poise. To permit both poises to be suspended in or over the same notch in the beam, the top of the bail of the pound-poise is also notched or grooved at $k$ to receive therein the knife-edge of the bail of the ounce-poise.

To render both poises serviceable upon the beam, the latter is provided with two sets of graduations and a series of notches upon its upper face to receive both poises, the upper graduation being intended for pounds—in the present instance from zero to thirty-two pounds—and the lower one for ounces, from zero to sixteen ounces. As shown in the drawings, the weight indicated is twelve pounds and eleven ounces.

To try the correctness of the scale, both poises are placed with their bails over the zero on the beam. To weigh one pound, the poise K is shifted to the first notch adjoining 0, and the poise L placed in the notch 0; or otherwise the poise K may remain in the notch 0, and the poise L be shifted to the last notch on the beam, indicating sixteen ounces, or one pound.

The beam D is shown as having graduations of pounds and ounces; but it may as conveniently be divided into kilograms and grams, and more poises than two may be used for a combination of weights without departing from the spirit of my invention, provided said poises are made, as of ring form, to pass through each other. The platform B may also be made of various forms, and be provided with a scoop, if desired.

The knife C is retained centrally between the grooved brackets $b$ of the frame by a pin, $m$, in the groove of one of the brackets entering the notch $c^3$ in one of the edges $c$ of the knife.

Having now fully described my invention, I claim—

1. The combination of a vertical frame having grooved notches to receive knife-edge journals with a beam provided with a double set of knife-edges and a platform having a downward-extending arm formed with grooved recesses to receive knife-edges at the top and bottom, substantially as and for the purpose described.

2. In combination with a vertical frame having grooved brackets to receive knife-edge journals, a beam having two poises and graduated scales and a platform formed with a downward-projecting arm having a steel bearing, $b^1$, and a pin, $b^2$, in its lower end, the double knife C, having notches $c^2$ $c^3$ in its edges to retain said arm and beam, substantially as and for the purpose set forth.

3. In combination with the grooved ears $a'$ on the upper branches of the frame and corresponding lugs $b^4$ on the under side of the platform, the double-edge knife F, bearing against said lugs and ears, substantially as and for the purpose described.

4. In combination with the beam of a scale, the weights or poises K and L, one of which is in the form of a ring or its equivalent to allow one to pass through the other, substantially as and for the purpose set forth.

5. In combination with the beam of a scale and poises K and L, constructed to permit the latter to encircle the former, the groove $k$ in the top of the bail of poise K, substantially as and for the purpose described.

6. In combination with poises of ring form, or capable of passing one through the other, a beam provided with two graduated scales, each scale being adapted to indicate the weight balanced by one of the poises, substantially as described.

7. In combination with the beam and double knife C placed at the inner end of said beam, the screw $e$, to secure the two together and form the support for the equipoise E, substantially as described.

WILLIAM C. FARNUM.

Witnesses:
JOHN J. WILDER,
FRED B. TUTTLE.